US005911142A

United States Patent [19]

Smith et al.

[11] Patent Number: 5,911,142

[45] Date of Patent: Jun. 8, 1999

[54] SYSTEM AND METHOD FOR BRIDGING COMPLIANT AND NON-COMPLIANT FILES

[75] Inventors: Allan Michael Smith; Thomas L. Durnell, both of Cincinnati, Ohio

[73] Assignee: Millennium Dynamics, Inc., Billerica, Mass.

[21] Appl. No.: 08/906,344

[22] Filed: Aug. 5, 1997

Related U.S. Application Data

[60] Provisional application No. 60/051,451, Jul. 1, 1997.

[51] Int. Cl.[6] .................................................. G06F 17/30

[52] U.S. Cl. ......................... 707/101; 707/102; 395/704; 395/712

[58] Field of Search .................................... 707/100, 101, 707/102, 200; 395/701, 704, 708, 712

[56] References Cited

U.S. PATENT DOCUMENTS

| | | | |
|---|---|---|---|
| 5,600,836 | 2/1997 | Alter | 707/101 |
| 5,761,668 | 6/1998 | Adamchick | 707/101 |
| 5,794,048 | 8/1998 | Brady | 395/705 |
| 5,809,500 | 9/1998 | Nolan | 707/6 |
| 5,838,979 | 11/1998 | Hart et al. | 395/707 |

OTHER PUBLICATIONS

Vanatage YR200 User's Manual Version 1.0, Millennium Dynamics, Inc., Dec. 1995 (This document was supplied by applicant and is cited here to make the document of record.).

*Primary Examiner*—Paul R. Lintz
*Assistant Examiner*—John C. Loomis
*Attorney, Agent, or Firm*—Price, Heneveld, Cooper, DeWitt & Litton

[57] ABSTRACT

The system and method of the present invention automatically converts field lengths of data fields in a data file that are accessed by a computer program and correspond to date-related data. Either the computer program or the data file may be non-compliant. This function is carried out by providing a control program including parameters and commands for converting the field length of a date-related data field in the data file, inserting codes in the computer program file including a subroutine calling command such that the control program will be called and executed as a subroutine from within the computer program file, executing the computer program file, and executing the control program when the computer program executes the subroutine calling command to automatically convert the field length of a date-related data field identified by the computer program in order to allow either inclusion or exclusion of the century in a portion of the data field indicating the year prior to manipulation of the date-related data by the computer program. The control program may be executed on-line or in batch when the computer program executes the subroutine calling command. The step of providing the control program includes inserting file conversion parameters into a model control program to generate a control program file, and compiling the control program file to generate the control program.

29 Claims, 3 Drawing Sheets

SYSTEM AND METHOD FOR BRIDGING COMPLIANT AND NON-COMPLIANT FILES

CROSS-REFERENCE TO RELATED APPLICATION

This application claims priority under 35 U.S.C.§ 119(e) on U.S. Provisional Application 60/051,451 entitled "SYSTEM AND METHOD FOR BRIDGING COMPLIANT AND NON-COMPLIANT FILES" filed on Jul. 1, 1997, by Allan Michael Smith and Thomas L. Durnell, the entire disclosure of which is incorporated by reference herein.

BACKGROUND OF THE INVENTION

The present invention generally relates to a method for converting data field lengths in computer program files. More particularly, the present invention relates to a computer-implemented method for converting data field lengths in computer program files and/or databases for compliance with the next century.

Presently, many businesses rely upon computer programs that generate and utilize date-specific data. Such computer programs include, for example, programs for maintaining a database of insurance claims and dates on which such claims were made, and software used for tracking telephone calls in computing billing records. Because most of these computer programs have only used data fields having two characters reserved for the year (i.e., Dec. 31, 1995), these computer programs assume that the year occurs in the twentieth century and thus, will not be able to distinguish between dates occurring in this century and those occurring in the next century. For example, if the computer program generates or accesses an invoice due date of "Jan. 1, 2000," the program will assume a due date of Jan. 1, 1900, even though Jan. 1, 2000, was intended, and will incorrectly designate the account as overdue and compute interest due on the account starting from the Jan. 1, 1900, date. Thus, it may be crucial for businesses to modify their existing computer programs for compliance with the next century.

Although these computer programs could be modified manually by going through each line of code of the programs and each segment of data in a database to make the necessary changes for compliance with the next century, such manual revision is tedious, very time consuming, and costly and is subject to human error. Given the number of computer programs presently used by businesses and the number of lines of code in such programs, there exists a need for an automated process for making necessary modifications in a computer program for compliance with the next century.

The assignee of the present invention has developed a set of computer-implemented tools for automatically converting the field length of data relating to dates. These tools are used to convert all of one's non-compliant program files and data files into files that are century compliant. However, it may not always be desirable to convert all of one's non-compliant program files and/or data files. For example, one may wish to use a new, upgraded, or converted century compliant program to operate on non-compliant data without having to permanently convert the data. Conversely, one may not want to permanently convert a non-compliant program to work with compliant data. Therefore, there exists a need for a bridging tool set that may be called from within a compliant or non-compliant client program in order to allow non-compliant program codes or data fields to be used with compliant program codes or data fields without requiring the non-compliant components to be permanently converted.

SUMMARY OF THE INVENTION

Accordingly, the present invention has been made to overcome the above problems. One aspect of the present invention is to provide a method for automatically converting the data field lengths in a non-compliant component of a computer program corresponding to the year from two characters to four characters and to insert or delete "19", "20", "00", or "99" into/from dates read from existing databases where appropriate for use with compliant components. Another aspect of the present invention is to provide a computer-implemented process that may be called from within a compliant program to temporarily convert non-compliant data for use by the calling compliant program. Yet another aspect of the present invention is to provide a computer-implemented method that may be called from within a non-compliant program to temporarily convert data from a compliant data file into non-compliant so that it may be read and manipulated by the non-compliant program.

A further aspect of the present invention is to provide a system for automatically converting data representing a specified item of data, such as a date, telephone number, zip code, social security number, etc., that may be found in program or data files.

To achieve these and additional aspects and advantages, the method of the present invention automatically converts field lengths of data fields in a data file that are accessed by a computer program and correspond to a date. The method comprises the steps of providing a control program including parameters and commands for converting the field length of a data field corresponding to date-related data, inserting codes in the computer program file including a subroutine calling command such that the control program will be called and executed as a subroutine from within the computer program file, executing the computer program file, and executing the control program when the computer program executes the subroutine calling command. When executed, the control program automatically converts the field length of a date-related data field identified by the computer program in order to allow either inclusion or exclusion of the century in a portion of the data field indicating the year prior to manipulation of the date-related by the computer program. The control program may be executed on-line or in batch when the computer program executes the subroutine calling command. The step of providing the control program includes inserting file conversion parameters into a model control program to generate a control program file, and compiling the control program file to generate the control program.

If the computer program is century compliant and must interact with non-compliant data files, a temporary data record is created, the identified date-related data is copied from the non-compliant data file into temporary data record, the control program increases the field length of the date-related data field in the temporary data record and then automatically inserts century data into the expanded date-related data field prior to manipulation thereof by the computer program. On the other hand, if the computer program is not century compliant and must interact with compliant data files, the identified date-related data is copied into a temporary data record and the control program automatically deletes the existing century data from the identified date-related data field in the temporary data record. The temporary data record is not written back into the pre-existing data file unless the computer program has altered the date-related data or created new date-related data that must be written into the pre-existing data file. When data that is changed or created by the computer program is to be written back into the pre-existing data file, the control program converts the data into either compliant or non-compliant data by adding or deleting the century depending upon whether the pre-existing data file is compliant or non-compliant.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification, illustrate several embodiments of the invention and together with the description, serve to explain the objects, advantages, and principles of the invention. In the drawings.

DETAILED DESCRIPTION OF PREFERRED EMBODIMENTS

Figure 1:
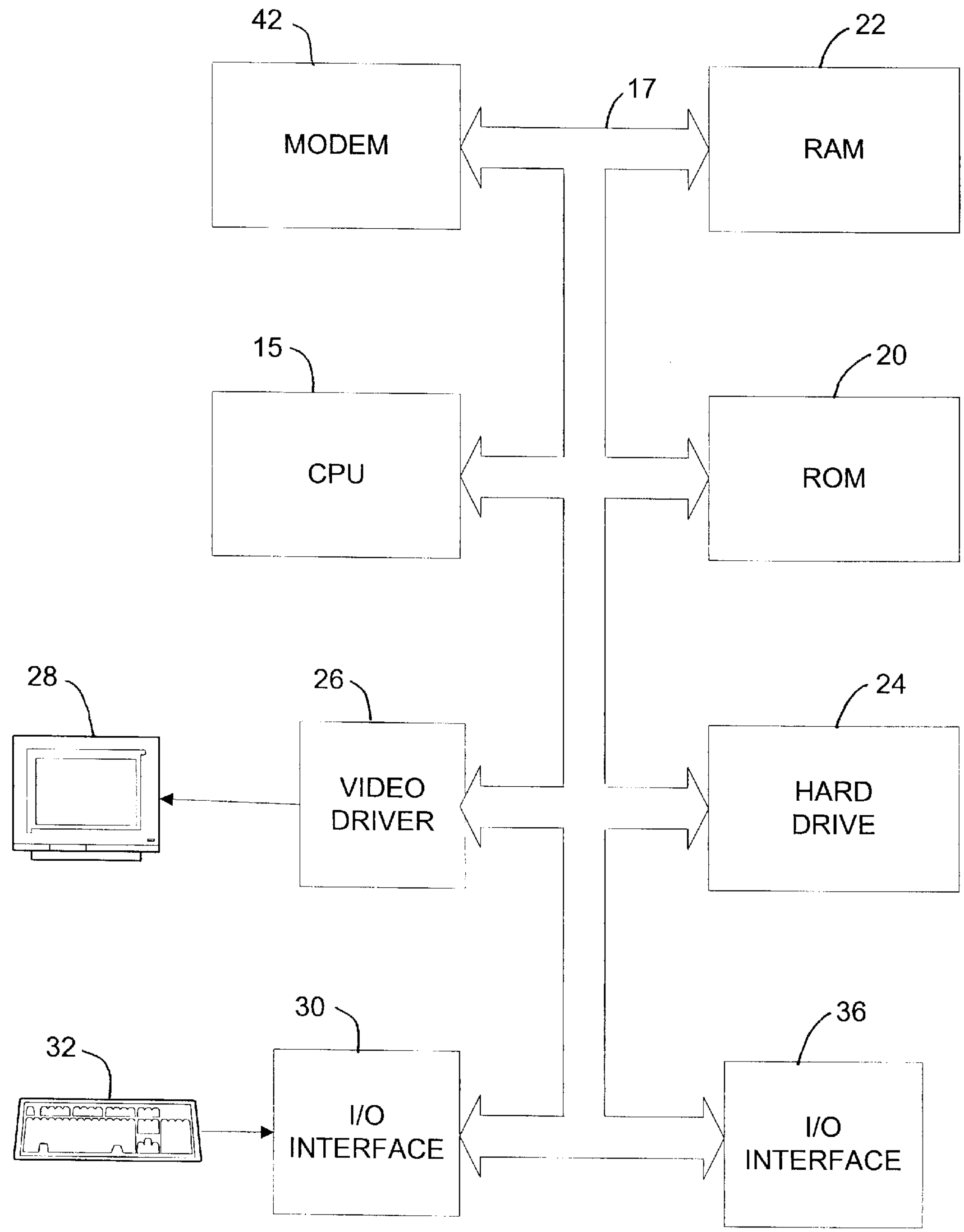
FIG. 1 is a block diagram illustrating the construction of a conventional personal computer in which the present invention may be utilized.

As mentioned above, the present invention relates to computer software embodying a method for automatically converting existing computer program files and any associated data files for compliance with the next century. The computer software of the present invention may be utilized in a conventional mid-size computer or a main-frame computer. A general overview of the construction of a conventional computer 10 is illustrated in FIG. 1. PC 10 includes a central processing unit (CPU) 15 connected to a bus 17 to control the overall operation of computer 10. Computer 10 further includes a read only memory (ROM) 20, a random access memory (RAM) 22, a hard drive 24, a video driver 26 connected to a display monitor 28, and a first I/O interface 30 connected to a keyboard 32. Also, computer 10 may optionally include a second I/O interface 36 and/or a modem 42. Preferably, RAM 22 is 8 MB or more and CPU 15 includes a processor having a speed greater than an Intel 386 processor.

The computer program files in which the present invention will convert its data field lengths and code for compliance with the next century, may take several forms and/or include date-specific data in many different formats and locations. Such computer programs may include various combinations of copybooks; job control language (JCL) Job Libraries; libraries of procedures invoked by JCL (PROC Libraries); Source Libraries, which may be written in COBOL, TELON, Assembler, PL/I, or other languages; Copylib Libraries; and COBOL Source Panvalet or partitioned data set (PDS) files. As will be explained in more detail below, the COBOL Source Panvalet or PDS files may include Panexec Load Libraries, Panvalet Source Libraries and PDS Load Libraries, Panvalet Backup Source, Panvalet Test/Prod Source, COBOL PDS Source, and COBOL Panvalet Source. The "Panvalet" and "Panexec" files are those created and associated with the PANVALET and PANEXEC products marketed by Pansothic Corporation. Other product files similar to the PANVALET and PANEXEC files are ENDEAVOR- or LIBRARLAN-type libraries. The computer programs to be converted may also include customer information communication services (CICS), which is an on-line product by IBM that supports multiple terminal interaction. The programs that run in this environment can be TELON, Assembler, PL/I, or COBOL. The CICS environment needs to know the names of the programs that are allowed to run in CICS, the names of the transaction codes, and what programs to execute when the transaction is typed in and what files are allowed to be updated. This information for CICS is stored in system tables including program process tables (PPT), program control tables (PCT), and file control tables (FCT).

The system of the present invention includes a computer hardware used to implement specific functions. As noted above, these functions may be executed on a main-frame computer or mid-size computer. As discussed in more detail below, the system preferably includes means for generating a control program including parameters and commands for converting the data field length of date-related data in a data file, and means for executing the control program when a computer program executes a subroutine calling command that has been inserted within the computer program file. The control program including means for automatically converting the data field length of date-related data identified by the computer program in order to allow either inclusion or exclusion of the century in a portion of the data field indicating the year prior to manipulation of the date-related data by the computer program. In accordance with a first embodiment, which is described below with respect to FIG. 2, the control program is executed in batch when the computer program executes the subroutine calling command. In accordance with a second embodiment, which is described below with respect to FIG. 3, the control program is executed on-line when the computer program executes the subroutine calling command.

Figure 2:
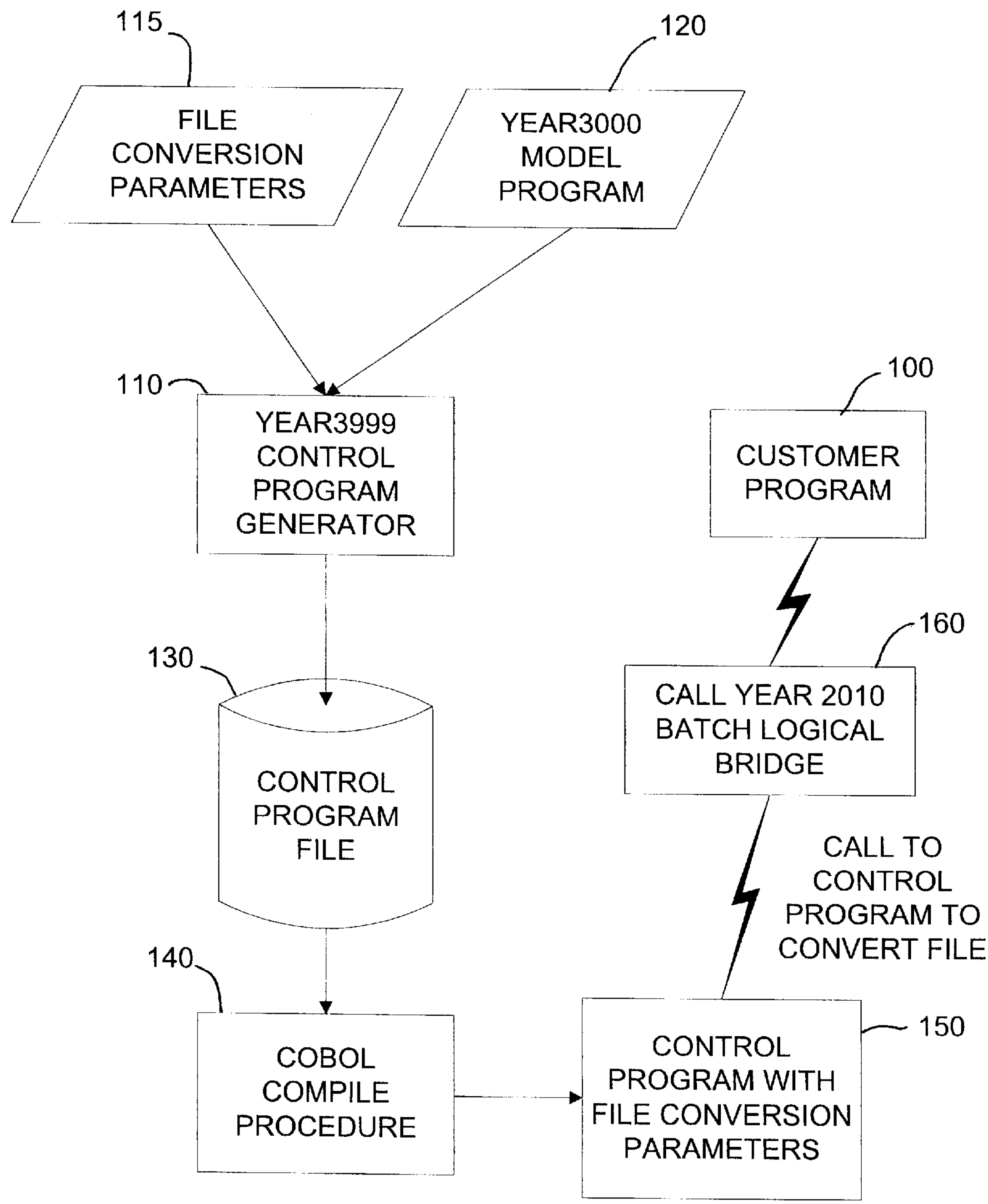
FIG. 2 is a flow diagram illustrating an overview of the sequence of operations performed in accordance with the methodology of a first embodiment of the present invention.

FIG. 2 illustrates an overview of the flow of operations performed in accordance with a first embodiment of the inventive methodology. The first embodiment pertains to the implementation of the present invention with respect to a batch customer program 100. Customer program 100 may be a century-complaint program that interacts with a non-compliant data file, or program 100 may be a non-compliant program that interacts with a compliant data file. To enable the compliant and non-compliant programs and data files to interact, the present invention provides a bridging routine that will present the data read from a non-compliant data file to a compliant program 100 as being compliant data (i.e., including the century in the date) or presents the data read from a compliant data file to a non-compliant program 100 as being non-compliant data.

As described in more detail below, the bridging routines of the present invention are implemented by inserting codes into customer program 100 including a subroutine calling command 160 that calls a control program 150 as a subroutine during the execution of customer program 100. Either control program 150 or the code inserted in customer program 100 copies the date-related data that is requested by customer program 100 from the data file into a temporary data record. The control program 150 then converts the field length of the data fields including any requested date-related data to allow for the inclusion or exclusion of the century from the portion of the date-related data indicating the year. The converted date-related data is then presented to customer program 100 for further manipulation.

Control program 150 is a program that is customized to operate with the particular customer program 100 with which it must interact. Control program 150 is generated by the YEAR3999 control program generator 110, which fits file conversion parameters 115 into the YEAR3000 model program 120 to produce a control program file 130. Control program file 130 is then compiled by a COBOL compiling procedure 140 to produce control program 150.

The customization of control program 150 is enabled by the selection of particular file conversion parameters 115 that will enable control program 150 to either expand date-related data fields in a non-compliant data file for use with a compliant program or to enable control program 150 to decrease the field lengths of date-related data fields read from a compliant data file by a non-compliant program. YEAR3000 model program 120 is provided to allow a programmer creating control program 150 to more easily construct control program 150 in a format that will cooperate with the recommended calling codes that are inserted into customer program 100. In particular, the calling codes inserted into the customer program 100 pass, in linkage, the following items to the bridge between the customer program 100 and the control program 150: the input record; the record size; the record format; the name of the customer's record program that contains the conversion parameters; the code for inserting or swapping back; the return code; and the returned record. If the application program 100 uses tables, the customer would also pass the name of the table that corresponds to the table's specific conversion parameters. Upon return to the customer's program 100, the expanded or swapped-back record is now available to the customer program 100. These calling codes are preferably inserted into both the Working Storage and Procedure Division of customer program 100. Assuming the naming conventions are the same, the Procedure Division logic should be duplicated after each application input/output. In the examples that follow, any names in lowercase need to be named specifically for the customer application. The following code is preferably inserted in the Working Storage of customer program 100 to enable operation of the table bridge utility.

The Table Bridge Utility requires the following elements in Working Storage

```
01  BINARY-NUMBER                       PIC S9(4)   COMP.
01  BINARY-NUMB-X          REDEFINES   BINARY NUMBER.
    05  BIN-NUM-1                       PIC X(01).
    05  BIN-NUM-2                       PIC X(01).
01  DYNC-YEAR2010                       PIC X(08) VALUE 'YEAR2010'.
01  YEAR2010-CONTROL-INFO.
    05  YEAR2010-ACTION-CODE            PIC X(01).
        88  CONVERT-IT                  VALUE 'C'.
        88  SWAP-IT-BACK                VALUE 'S'.
    05  YEAR2010-RETURN-CODE            PIC X(01). VALUE SPACE.
05  YEAR2010-CONTROL-PROGRAM            PIC X(08). VALUE 'YEAR3---'
***  *************************************************************  ***
***      NOTE #1: BIN-NUM-2 is the record format low order byte.    ***
***      It ends up in YD-DCB-37 soon.                              ***
***      NOTE #2: The VALUE 'YEAR3---' should be the name of        ***
***      the control program containing the SL/SW and Action Commands ***
***      that was created by YEAR3999.                              ***
***  *************************************************************  ***
01  YEAR2010-SEGMENT-DCB-INFO.
    05  YEAR2010-IMS-SEGMENT            PIC X(08)   VALUE SPACES.
***  *************************************************************  ***
***      NOTE #3: Use YEAR2010-IMS-SEGMENT when there is absolute   ***
***      identify of a record segment or fixed record. Use it only  ***
***      with the T=TABLENAME identification technique. When using  ***
***      positional parameters, be sure it is blank.                ***
***  *************************************************************  ***
    05  YEAR2010-DCB.
        10  YD-DCB-01-36                PIC X(036)  VALUE SPACES.
        10  YD-DCB-37                   PIC X(001)  VALUE SPACES.
        10  FILLER                      PIC X(025)  VALUE SPACES.
        10  YD-DCB-63-64                PIC X(002)  VALUE SPACES.
        10  FILLER                      PIC X(018)  VALUE SPACES.
        10  YD-DCB-83-84                PIC X(002)  VALUE SPACES.
        10  FILLER                      PIC X(116)  VALUE SPACES.
***  *************************************************************  ***
***      NOTE #4:  YD-DCB-37 is the record format low order byte    ***
***                YD-DCB-63-64 is the record lenght                ***
***                YD-DCB-83-84 is the block size                   ***
***  *************************************************************  ***
01  BIG-IN-RECORD                       PIC X(32760).
01  PIC-32760                           REDEFINES BIG-IN-RECORD.
    05  BIG-IN-1000.
        10  BIG-IN-600.
            15  BIG-IN-1-500.
                20  BIG-IN-400.
                    25  BIG-IN-300.
                        30  BIG-IN-200.
                            35  BIG-IN-100  PIC X(100).
                            35  FILLER      PIC X(100)
                        30  FILLER          PIC X(100).
                    25  FILLER              PIC X(100).
```

-continued

```
The Table Bridge Utility requires the following elements in Working Storage

              20  FILLER                      PIC X(100).
           15  FILLER                         PIC X(100).
        10  FILLER                            PIC X(400)
     05  FILLER                               PIC X(31760).
01   BIG-OUT-RECORD                     PIC X(32760)
***  ******************************************************************  ***
***     Note #5: This should be adjusted based on the size of the        ***
***     record. Also, consider the RDW for variable lenght records.      ***
***     In the Procedure Division, we will move the record to one of     ***
***     the "big-in" records. To make this work most efficiently, it     ***
***     should be tailored to the size of the record                     ***
***  ******************************************************************  ***
```

Further, the following logic should preferably be inserted into a program after the the I/O step.

```
     MOVE 128                   TO BINARY-NUMBER.
***  ******************************************************************  ***
***     Note #1: Use 128 for fixed format. Use 80 for variable length    ***
***     records.                                                         ***
***  ******************************************************************  ***
     MOVE BIN-NUM-2             TO YD-DCB-37.
     MOVE <<Record/data length>> TO BINARY-NUMBER.
     MOVE BINARY-NUMB-X         TO YD-DCB-63-64.
                                TO YD-DCB-83-84.
***  ******************************************************************  ***
***     Note #2: <<Record/data length>> should be the actual or          ***
***     "ballpark" record length.                                        ***
***  ******************************************************************  ***
     MOVE 'SEGMT001'            TO YEAR2010-IMS-SEGMENT.
***  ******************************************************************  ***
***     Note #3: Use the specific name for the tablename from the        ***
***     SL/SW Action Group. Use spaces if the seletion or swaps is       ***
***     using positional parameters.                                     ***
***  ******************************************************************  ***
     MOVE USERS-RECORD          TO <<Big-In-Record>>.
***  ******************************************************************  ***
***     Note #4: Move the appropriate size of the redefined record       ***
***     called BIG-IN-RECORD. It is inefficient to move a small user     ***
***     record into a large "big-in-record".                             ***
***  ******************************************************************  ***
     CALL DYNC-YEAR2010       USING    YEAR2010-CONTROL-INFO
                                       YEAR2010-TABLE-DCB-INFO
                                       BIG-IN-RECORD
                                       BIG-OUT-RECORD.
     IF YEAR2010-RETURN-CODE =         SPACE
         PERFORM <users-logic-path>
     ELSE
         PERFORM NO-ACTION-TAKEN-ROUTINE.
(REFER TO THE ERROR CONDITIONS)
     <users-record> refers to the input record (the results of the I/O)
     <recsize> refers to the maximum customer's record size.
     <cust rec pgm> refers to the program containing the conversion parameters
     <user-logic-path> refers to the application program
```

The above examples when in customer program 100 provide the required information outlined above to bridge 160 for use by control program 150. The manner by which control program 150 uses this information to perform the desired conversion is described below following a general overview of the second embodiment of the present invention.

Figure 3:
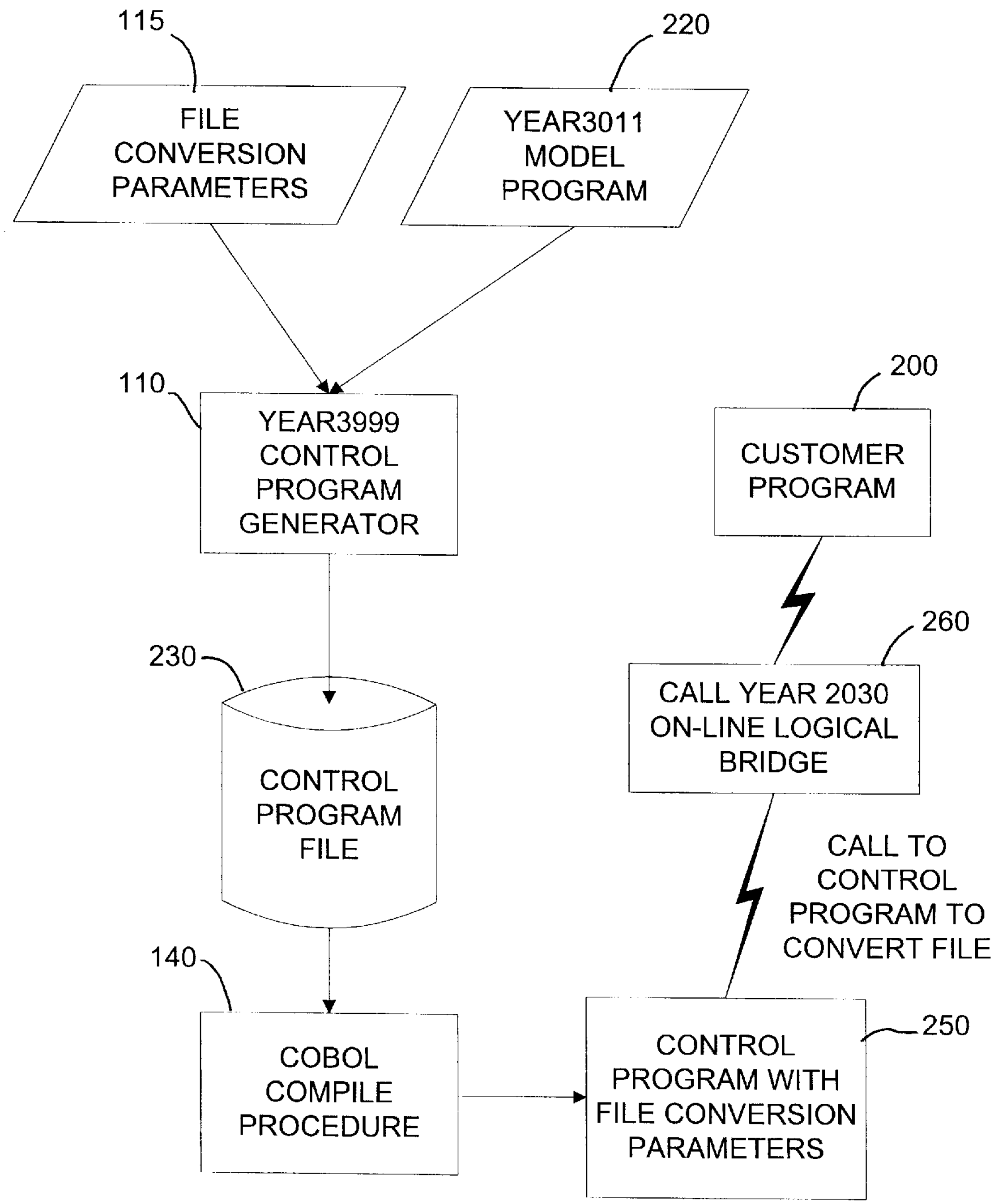
FIG. 3 is a flow diagram illustrating an overview of the sequence of operations performed in accordance with the methodology of a first embodiment of the present invention.

FIG. 3 shows the general operation of the inventive method according to the second embodiment. This embodiment is similar to the first embodiment except that customer program 200 is executed on-line in cooperation with a slightly different control program 250 through bridge 260. Control program 250 is created by inserting file conversion parameters 115 into YEAR3011 model program 220 by YEAR3999 control program generator 110. The resulting control program file 230 is compiled in the same manner by COBOL compiled procedure 140 as in the first embodiment to produce control program 250. The recommended logic code that should be inserted into the working storage of the customer program 200 (which is typically a CICS program) is as follows:

```
01  WORK-YEAR2030.
    05  DYNC-YEAR2030            PIC X(08)   VALUE  'YEAR2030'.
    05  A-DUMMY                  PIC X(01)          VALUE SPACE.
    05  A-SPACE                  PIC X(01)          VALUE SPACE.
    05  CTR-YEAR2030             PIC S9(09)         COMP-3 VALUE +0.
    05  YR2K-BINARY-X REDEFINES YR2K-BINARY.        COMP.
        10  YR2K-BIN-1           PIC X(01).
        10  YR2K-BIN-2           PIC X(01).
**  SIZE IS 20218 BYTES/CHARACTERS
01  YEAR2030-LINKAGE-20218.
    02  YEAR2030-CONTROL-INFO.
        05  YEAR2030-ACTION-CODE          PIC X(01)  VALUE 'C'.
            88  CONVERT-IT                           VALUE 'C'.
            88  SWAP-BACK                            VALUE 'S'.
        05  YEAR2030-RETURN-CODE          PIC X(01)  VALUE SPACE.
        05  YEAR2030-TABLE-PROGRAM        PIC X(08)  VALUE 'YEAR3---'
    02  BIG-IN-DDNAME.
        05  YEAR2030-CICS-TABLE           PIC(08)    VALUE SPACES.
        05  BI-DCB.
            10  BI-DCB-01-36  PIC X(036)  VALUE SPACES.
            10  BI-DCB-37     PIC X(001)  VALUE SPACES.
            10  FILLER        PIC X(025)  VALUE SPACES.
            10  BI-DCB-63-64  PIC X(002)  VALUE SPACES.
            10  FILLER        PIC X(018)  VALUE SPACES.
            10  BI-DCB-83-84  PIC X(002)  VALUE SPACES.
            10  FILLER        PIC X(116)  VALUE SPACES.
    02  BIG-IN-RECORD            PIC X(100000).
    02  BIG-10000                REDEFINES BIG-IN-RECORD.
        05  BIG-IN-1000.
            10  BIG-IN-600.
                15  BIG-IN-1-500.
                    20  BIG-IN-400.
                        25  BIG-IN-300.
                            30  BIG-IN-200.
                                35  BIG-IN-100   PIC X(100).
                                35  FILLER       PIC X(100).
                            30  FILLER           PIC X(100).
                        25  FILLER               PIC X(100).
                    20  FILLER                   PIC X(100).
                15  FILLER                       PIC X(100).
            10  FILLER                           PIC X(400).
        05  FILLER                               PIC X(10000).
    02  BIG-OUT-RECORD     PIC X(10000).
```

The "BIG-IN" area should preferably be built according to the user's movement of records. It should reflect the size of the record being moved. Redefining BIG-IN-RECORD to smaller size definitions reduces the compiler generation of spacing when moving records to BIG-IN-RECORD. BIG-IN-RECORD and BIG-OUT-RECORD are defined as 10k in the YEAR2030 program.

The following logic is preferably inserted into the Procedure Division of the customer program 200 after the CICS I/O function:

```
      MOVE 'TABLE001'                       TO YEAR2030-CICS-TABLE.
***   ESTABLISH RECORD FORMAT AND SIZE      TO YEAR2030
      MOVE 128                              TO YR2K-BINARY.
      MOVE YR2K-BIN-1                       TO BI-DCB-37.
      MOVE <<<< users record length >>>>    TO YR2K-BINARY.
      MOVE YR2K-BINARY-X                    TO BI-DCB-63-64
                                               BI-DCB-83-84,
      EXEC CICS
                LINK PROGRAM('YEAR2030')
                COMMAREA(YEAR2030-LINKAGE-20218)
                LENGTH(20218)
      END-EXEC.
      IF    YEAR2030-RETURN-CODE       = SPACE
            PERFORM USERS-LOGIC-PATH
      ELSE
            PERFORM NO-ACTION-TAKEN-ROUTINE.
      NO-ACTION-TAKEN-ROUTINE.
```

The manner in which the above codes inserted into customer programs 100 or 200 interacts with control program 150 or 250 will now be described. In general, the control program includes certain scripting language including Select (SL) and Swap (SW) Statements, which provide the ability to select records to insert data or to swap data out of records, and Action Commands that define what changes to make to the selected data. SELECT and SWAP have specific. definitions for the scripting language. SELECT, represented by SL Statements, identify records to add century or other data. SWAP, represented by SW Statements, identify records to remove (swap out) century or other data. These statements identify records and assign them to specific Action Groups. Later, Action Commands define the conversion activity to take on these Action Groups.

In the bridging tool of the present invention, SL/SW Statements use two different techniques to identify data. The first technique is a positional select/swap which is the most common SL/SW identification technique. Examples (1), (2), and (3) show positional Select and Swap Statements. They select data based on the values of specific positions in the record. The second technique is a table select/swap which works for on-line and batch bridges. Examples (4) and (5) below show Select and Swap Statements that use the table technique. This statement provides the table or IMS segment name to a bridging control program (150 or 250).

```
    12345678901234567890123456789012345678901234567890123456789012345
(1) SL   001 P00001'1+2+3' P00035'2'
(2) SW   001 P00001'1+2+3' P00037'2'
(3) SL   002 P00001'4+5' P00075'NEW YORK'
(4) SL   003 T=TABLENAME
(5) SW   003 T=TABLENAME
(6) SL   999 NOW
(7) SW   999 NOW
```

The format of the coding for the exemplary SL/SW Statements are as follows:

| POS | Contents | Definition |
|---|---|---|
| 1–2 | SL or SW | SL for adding data to the record. SW for swapping (removing) data from the record. |
| 3–4 | BLANK | |
| 5–7 | ACTION GROUP | The Action Group. This three position alphanumeric code matches the records selected by the SL/SW Statements to the Conversion Action Command that changes the data. |
| 8–80 | POSITIONAL STATEMENTS | Depending on the selection technique, there are two ways to code this area. |

The Action Group is provided in the SL/SW Statements to assign the records to these Action Groups. Action Group Codes tie Select Statements to Action Commands. The Action Commands define the changes to make to the record.

The positional statements in positions 8–80 may be coded in three different ways. For a positional Select/Swap (examples 1, 2, and 3), positions 9–14 include a "P" followed by the five position location to begin checking in the data. For example, to begin checking for a value in position 10 of the data record, "P00010" is entered. In positions 15–18 for a positional SL/SW Statement, the values to look for in the position are listed. Such a positional statement (P0001, etc.) followed by the values to check may be repeated up to the length of the 80-byte record. The literal description of the positional statement in examples (1), (2), and (3) are:

(1) Select data and assign it to Action Group 001 when position 1 has a value of 1 or 2 or 3 and position 35 has a value of 2.

(2) Swap data and assign it to Action Group 001 when position 1 has a value of 1 or 2 or 3 and position 37 has a value of 2.

(3) Select data and assign it to Action Group 002 when position 1 has a value of 4 or 5 and position 75 is the starting position for the value NEW YORK.

The positional parameter (P00001, etc.) indicates the beginning position of the search. The selection statement following the positional parameter can be any length up to the end of the 80-position record. For example, in example (3), the positional parameter indicates to search for "NEW YORK" beginning in position 75. This eliminates the need to code each position individually. It is not necessary to check for "N" in 75, "E" in 76, "W" in 77, etc. The start and end of each selection statement preferably begins with a single tick ('), for example, a '12+REC'. The (+) indicates an OR condition. Because the plus sign and the tick have special meaning to this particular scripting language, the selection criteria, itself, should not contain' or +. For a table select/swap (examples (4) and (5)): positions 9–16 of the positional statement are filled with a "T=" followed by the table name and positions 17–80 are left blank. The "T=" identifies this Select or Swap Statement as a Table Command which is followed by the table name. The literal description of the table statements in examples (4) and (5) are:

(4) Select data and assign it to Action Group 003 when the data is associated with a table or IMS segment named TABLENAME.

(5) Select data and assign it to Action Group 003 for swap back when the data is associated with a table or IMS segment named TABLENAME.

Preferably, data is assigned uniquely to Action Groups. A record cannot be assigned to more than one Action Group. It will be assigned to the first SL/SW Statement that identifies the record. However, different SL/SW Statements can assign different records to the same Action Group. When coding positional SL Statements, the positions typically match non-compliant copybooks, whereas when coding SW Statements, the positions typically match compliant copybooks.

As noted above, Action Commands define what changes to make to select data. There are ten different Action Commands. They are:

A) INSERT/DELETE

B) DELETE/INSERT

C) INSERT/DELETE A SINGLE CHARACTER

D) INSERT/DELETE INTO A FIXED RANGE

E) REPLACE CHARACTER STRINGS

F) INSERT/DELETE CENTURY IN PACKED FIELD

G) INSERT/DELETE CENTURY IN BINARY FIELDS

H) INSERT/DELETE CENTURY IN AN OCCURS

I) INSERT/DELETE CENTURY IN AN OCCURS DEPENDING ON

J) USER EXIT FUNCTIONS

Internally, control program (150 or 250) strips off the whole record that is to be accessed by customer program (100 or 200). Then, it builds up (or down) based on the Action Commands. By taking this approach, the scripting language always uses the original location of the data. This simplifies the coding of the Action Commands. For example, after taking one action on a record, it is not necessary to "reposition" the description of the record for subsequent action. Consider a record with a date in position 20 and 30. The first action inserts century in position 20. Everything after the insertion shifts two positions to the right. However, the second action still points to the original position 30, not the "relocated" position 32. Because the control program strips the whole record, it is not necessary to adjust for each Insert/Delete action.

Most Action Commands can both add and delete data. If executed as part of a Select Statement (to add data), it adds data. If executed as part of a Swap Statement (to remove data), it removes that added data. This simplifies the use of this scripting language for bridging. It allows a single set of Action Commands to be stored with their corresponding Select or Swap Statements. A parameter in the JCL indicates whether the control program (150 or 250) should perform the actions based on Select or Swap Statements. Further, it is easy to switch files between their converted and unconverted state with one set of Action Commands. Those Action Commands have a mirror-opposite impact depending on whether they are executed as part of a Select or Swap Statement.

The Insert/Delete Action Command is used to insert and delete data, such as century. For fields that are not dates, the inserted/deleted data can be binary, hex, character, etc. For fields that are dates, the dates should be character (zoned decimal) data. For packed and binary format date fields, the appropriate packed or binary Action Command should be used. For non-date fields, this command inserts/deletes character, packed, and binary data.

The Insert/Delete Action Command inserts data when it matches a SL (select) record. This command deletes data when it matches a swap (SW) record. Note that the same Action Command has a completely different impact on a record, depending on whether it is executed on a Select or a Swap Statement.

The preferred format for an Insert/Delete Action Command is:

| POS | CONTENTS | DEFINITION |
|---|---|---|
| 1–3 | Action Group | The Action Group tying the Action Command to one Select or Swap Statement. |
| 4–8 | Blank | |
| 9–10 | Sequence | Identifies the sequence for changes. One record can have more than one action. For example, one record may have six date related insertions. The sequeuce indicates the order of execution. (01 is executed first, 02 is executed second, etc.) Always code the sequences moving from left to right through the data. |
| 11 | Comma | Comma delimiter |
| 12–16 | Insert Point | For date related insertions, enter the start of the date field (not necessarily the year in the date field). For example, if a date field starts in position 25, this should be 00025 regardless of whether the date is YYMMDD or MMDDYY format. For non-date related insertions, or when windowing is not used, this indicates the point to begin inserting data. |
| 17 | Comma | Comma delimiter |
| 18–19 | Insert Length | Length of the data to insert/delete. Can be from 1 to 60 positions. |
| 20 | Comma | Comma delimiter |
| 21–80 | Data to insert | Data to insert or delete. Note the special requirements for the Window and Format Command. |

There are two commands that may be used in combination with these Action Commands and affect the data that is inserted in positions 21–80. These commands include the Window Command and the Format Command. The Window Command provides the ability to use a logical approach to set the century in data. To use the Window Command, a target year is selected. The control program will then insert "19" when the value of the year field is greater than or equal to the target year and "20" when the year is less than the target year. The Window Command also interrogates the content of the date field and determines if default values apply. If the date field has defaults such as zeros, nines, or blanks, the Window Command inserts zeros, nines, or blanks as appropriate.

The Format Command indicates which date formats apply and whether the data is character (zoned decimal), packed or binary. With packed or binary, the location of the year and century within the date may not be apparent. The Format Command indicates where the year and century are in the date field. The Window and Format Commands are preferably used together. For example, when the date is 010615 that could be Jan. 6, 2015, or Jun. 15, 2001, depending on the date format. Supplying the format allows the Window Command to identify and interrogate the appropriate fields to determine the appropriate value or defaults.

When using the Window and Format Commands in connection with an Insert/Delete Action Command, the following format for columns 21–80 of that Action Command is as follows:

| | | | |
|---|---|---|---|
| 21–22 | Century | Always use 19. The Converter determines when to substitute '20' or default values. | |
| 23 | Blank | | |
| 24–27 | Window Command | LT Command such as LT25. The literal description of LT25 is: Insert 19 (value in 21–22) unless the value of the year field (identified in pos 12–16) is less than 25, then insert 20. | |
| 28–29 | Blank | | |
| 30 | Curr. Size | For date fields, this is the size of the non-compliant field. For example, YY is 2, MMYY is 4. (For two digits, use position 29 also.) | |
| 31–32 | Blank | | |
| 33 | New Size | For date fields, this is the size of the expanded, compliant field. For example, YY expanded to CCYY is 4, MMYY expanded to MMCCYY is 6. (For two digits, use position 32 also.) | |
| 34–34 | Blank | | |
| 35–38 | ZONE | The word ZONE describes the date as character (zoned decimal data). Use this for character data only. | |
| 43–48 | Format Command | The Format Command that describes the date format. This allows the File Converter to determine where to put The century field. Valid format commands are: | |
| | | YYMMDD | converts to CCYYMMDD |
| | | YYMM | converts to CCYYMM |
| | | YYDDD | converts to CCYYDDD |
| | | MMDDYY | converts to MMDDCCYY |
| | | MMYY | converts to MMCCYY |
| | | DDMMYY | converts to DDMMCCYY |
| | | YY | converts to CCYY |
| | | YYWW | converts to CCYYWW (WW = Weeks) |
| | | WWYY | converts to WWCCYY (WW = Weeks) |

The following shows four examples of this command and the literal description of each command.

```
    1234567890123456789012345678901234567890123456789012345678901230
(1) 001    01,00125,02,19
(2) 002    01,00025,02,19 LT45  6   8 ZONE    YYMMDD
(3) 002    02,00035,02,19 LT45  6   8 ZONE    MMDDYY
(4) 002    02,00055,04,FRED
(5) 003    01,00001,60,THIS REPRESENTS THE 60 CHARS
```

(1) When used with SL, for records identified by Action Group 001, the first item to perform is to go out to position 125 and insert the two position character 19. When used with SW, for records identified by Action Group 001, the first item to perform is to go out to position 125 and delete the two position character 19.

(2) When used with SL, for records identified by Action Group 002, the first item to perform is to go out to position 25 and recognize that this is the start of a character date field that currently occupies 6 positions in YYMMDD format. The tool identifies where century should go based on the format. It inserts the two position character 19, except inserts 20 when the year is less than (LT) 45. Additionally, this command inserts zeros, nines or blanks if that is the default value in the date field.

When used with SW, for records identified by Action Group 002, the first item to perform is to go out to position 25 and recognize that is the start of a date field containing character date (zoned decimal, not packed ordinary) occupying 8 positions in CCYYMMDD format. The tool identifies where century is based on the format. It deletes the two position century.

(3) Example 3 has a slight but important difference from example 2. In example 3, the definition is MMDDYY instead of YYMD. The position (in this case 35) still refers to the start of the date field. The tools looks at the format code to determine the location of the year, and where to put century. In example 2, the year and the start of the date field were the same. In example 3, the year and the start of the date field are in different locations. Always refer to the start of the date field. This is not necessarily the location of the year within the date field.

(4) When used with SL, for records identified by Action Group 002, the second item to perform is to go out to position 55 and insert the four position character FRED. The Converter interprets any prior repositioning (such as from sequence 01) so you do not have to change the position of the fields.

When used with SW, for records identified by Action Group 002, the second item to perform is to go out to position 55 and delete the four position character FRED. The Converter interprets any prior repositioning (sequence 01) so you do not have to change the position of the fields.

(5) For SL, for records identified by Action Group 003, the first item to perform is to go out to position 01 and insert the sixty characters displayed. Spaces will be inserted if less than 60 characters are provided. For SW, for records identified by Action Group 003, the first item to perform is to go out to position 01 and delete sixty characters.

The second Action Command is the Delete/Insert Action Command which is used to delete data when used with a Select Statement and to add data when used with a Swap Statement. Sometimes, it is necessary or desirable to convert data without expanding the length of the record. After inserting century, this Delete/Insert Action Command can remove filler from the end of the record to maintain the record length. When executed as part of a Swap Statement, this command inserts the filler data back into the record to maintain the record length. The following is a preferred layout for the Delete/Insert Action Command for use in connection with the inventive program.

| POS | CONTENTS | DEFINITION |
|---|---|---|
| 1–3 | Action Group | The Action Group that ties this Delete Command to the SL or SW Command. |
| 4–8 | Blank | |
| 9–10 | Sequence | Identifies the sequence of the command. One record may have more than one action. For example one record may have six date-related actions. The sequence indicates the order of execution. (01 is executed first, 02 is executed second, etc.) |
| 11 | Comma | Comma delimiter |
| 12–16 | Deletion Point | Indicates the position in the record to begin the delete. |
| 17 | Comma | Comma delimiter |
| 18–27 | Blank | |
| 28–30 | # to Delete | Indicates the number of positions to delete. |
| 35–40 | DELETE | DELETE instruction for the File Converter. This command deletes data when executed as part of a Select and inserts data when executed as part of a Swap. |

Here is an example of this command. We have a 50 byte record with one date located in position 23. There is filler in positions 46–50 represented by the values 12345. The value 1 in the first position identifies the data. We need to write the script to:

Identify this record and assign it to action group 001

Insert 19 in position 23

Delete two positions of filler from the end of the record so it stays 50 bytes.

Ensure the script can swap century out of position 23 for bridging non-compliant programs.

Ensure the converter leaves spaces and not low values on the end of the swapped-back record.

This shows the data and the script to accomplish this. The script looks like this:

```
    1234567890123456789012345678901234567890123456789012345678901230
(1) LV
(2) SL    001    P00001'1'
(3) SW    001    P00001'1'
(4) 001          01,00023,02,19
(5) 001          02,00049,              002   DELETE
```

The literal description of this script is:

(1) This LV Command tells the converter to leave spaces (not low values) at the end of a record on a swap back.

(2) Identify records for Select Action Group 001 where position one has a value of 1.

(3) Identify records for Swap Action Group 001 where position one has a value of 1.

(4) On a Select, for words identified as Action Group 001, the first thing to do is go out to position 23 and insert the two position value '19'. On a Swap, go out to position 23 and delete the '19'.

(5) On a Select, for records identified as Action Group 001, the second thing to do is go out to position 49 and delete two positions. On a Swap, go out to position 49 and add two positions.

The original, non-compliant data looks like this:

```
         1         2         3         4         5
12345678901234567890123456789012345678901234567890
1xxxxxxxxxxxxxxxxxxxxx96xxxxxxxxxxxxxxxxxxxxx12345
The compliant data (after inserting century and deleting two positions
from the end of the record) looks like this. Note that it maintains
its original record length.
         1         2         3         4         5
12345678901234567890123456789012345678901234567890
1xxxxxxxxxxxxxxxxxxxxx1996xxxxxxxxxxxxxxxxxxxxx123
The swapped back data looks like this:
         1         2         3         4         5
12345678901234567890123456789012345678901234567890
1xxxxxxxxxxxxxxxxxxxxx96xxxxxxxxxxxxxxxxxxxxx123..
```

Compare positions 49 and 50 in the original, converted and swapped-back data:

In the original data, it is 12345 to represent five characters of fill.

In the converted data it is 123 to show the impact of the Delete command to keep the 50 position record length unchanged.

In the swapped back data it is 123 . . . to show how this command inserted two spaces when executed as part of a swap. Note that it inserts spaces—it can not restore the original filler data of 45. Also note that it may have left low values instead of spaces if the LV Command was not used.

The third Action Command is the Add/Delete a Character Action Command, which adds (or deletes) a single character to a record. When executed through a Select Statement, this Action Command adds characters. With a Swap Statement, this Action Command deletes characters. The Add/Delete Action Command may add or delete a single character once or up to 999 times. For example, this Action Command can add a single space or up to 999 spaces to a record. All added characters are preferably the same. For example, this Action Command can add (1) or (11) to a record, but in typical use does not add "19" to a record. The preferred format for the Add/Delete a character Action Command is as follows:

| POS | CONTENTS | DEFINITION |
|---|---|---|
| 1–3 | Action Group | The Action Group that ties this command to one Select Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Add | The starting position to begin adding/ deleting characters. |
| 17–27 | Blank | |
| 28–30 | # to add | Number of positions to add/delete. |
| 31–34 | Blank | |
| 35–37 | ADD | ADD instruction for the File Converter. On a Swap back, this command deletes data. It does not add data on a swap. |
| 38–42 | Blank | |
| 43–45 | C = n (n = any char) | Provides the insertion character. For example C = X inserts X into the record. To insert blanks, leave 43–45 blank. It can be blank, hex or any character. (To insert hex, go into hex edit mode and enter the character.) |

Here are several examples of the Add a Character Command and their literal description:

```
         1         2         3         4         5
12345678901234567890123456789012345678901234567890123456789012345
(1)  001      01,00010      001      ADD  C = 11
(2)  001      02,00011      001      ADD  C = 9
(3)  002      01,00050      222      ADD            <- this leaves
(4)  003      01,00050      010      ADD  C = X     blanks
```

(1) For records identified by Action Group 001, the first item to perform is to go out to position 10 and add 1 in this position.

(2) For records identified by Action Group 001, the second item to perform is to go out to position 11 and add 9 in this position.

(3) For records identified by Action Group 002, the first item to perform is to go out to position 50 and add 222 spaces. Note the "C=" to identify the replacement characters is missing. This is leaves blanks.

(4) For records identified by Action Group 003, the first item to perform is to go out to position 50 and insert the character X 10 times.

The fourth Action Command is the Insert/Delete into a Fixed Range Action Command which is similar to using the combination of the Insert (with zone) and Delete Action Commands. The Insert/Delete into a Fixed Range Action Command will insert century into a range when it is not desirable to expand that range. For example, when a NAME field was reused to hold dates but it was not desirable to expand the NAME from 30 to 32 positions. This command inserts or deletes characters into a range by shifting and dropping data within the range. Data falling outside the range is not displaced. For example, this command inserts/ deletes century in positions 10 and 11 without affecting the position of data in positions 90 and 91. Because data at the end of the range is dropped to accommodate the new characters, this particular Action Command should only be used when the characters at the end of the range are filler. The format for this Insert/Delete into a Fixed Range Action Command is as follows:

| POS | CONTENTS | DEFINITION |
|---|---|---|
| 1–3 | Action Group | The Action Group that ties this Delete Command to the SL/SW Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter. |
| 12–16 | Range Start | Starting position of the range (not the insert). |
| 17 | Comma | Comma delimiter |
| 18–19 | Insert Length | Length of the data to insert. |
| 20 | Comma | Comma Delimiter |
| 21–22 | Insert Data | Data to insert (eg: 19) |
| 23 | Blank | Space delimiter. |
| 24–27 | WINDOW | Window Command(eg: LT45). This is optional. |
| 28–30 | Range Length | The length of the range (that started in the position identified in columns 12–16) |
| 31–34 | Blank | |
| 35–40 | INSERT | Insert instruction for the File Converter. |
| 41–42 | Blank | |
| 43–47 | YY Location | The YY location within the date field. |
| 48 | FORMAT | When using the WINDOW command (in 24–27), enter the corresponding FORMAT code. Leave this field blank when the WINDOW command does not apply. |
| 49–53 | YY Location | Second YY date location within the date field. |
| 54 | FORMAT | When using the WINDOW command (in 24–27), enter the corresponding FORMAT code. Leave |

| POS | CONTENTS | DEFINITION |
|---|---|---|
| | | this field blank when the WINDOW command does not apply. The format codes are:<br>1 = YYMMDD TO CCYYMMDD<br>2 = YYMM TO CCYYMM<br>3 = YYDDD TO CCYYDDD<br>4 = MMDDYY TO MMDDCCYY<br>5 = MMYY TO MMCCYY<br>6 = DDMMYY TO DDMMCCYY<br>7 = YY TO CCYY<br>8 = YYWW TO CCYYWW<br>9 = WWYY TO WWCCYY |
| 55–59 | YY Location | Third YY date field. |
| 60 | FORMAT | When using the WINDOW command (in 24–27), enter the corresponding FORMAT code. Leave this field blank when the WINDOW command does not apply. |
| 61–65 | YY Location | Fourth YY date field. |
| 66 | FORMAT | When using the WINDOW command (in 24–27), enter the corresponding FORMAT code. Leave this field blank when the WINDOW command does not apply. |

Positions 49 and subsequent are optional. They apply only when there are multiple actions in the range. They do not apply when there is only one action in the range. This option accommodates up to four separate actions in a range. The inserts may use different date formats. Note that the FORMATS (entered in 48, 54, 60 and 66) are one position numeric format codes.

The fifth Action Command is the Replace Action Command, which is used to replace a 1–10 character string with a 1–20 character string when used with a Select Statement. With a Swap Statement, this Action Command replaces a 1–20 character string with a 1–10 character string. This limitation as to the number of characters is for but one sequence. With multiple sequences, the number of characters is virtually unlimited. Thus, multiple sequences using this command allow replacing as many characters as needed. The Replace Action Command (REPL) changes/expands all records with an individual "item" to another "item." When there is a large series of changes, it may be more efficient to use the Exit Action Command described below. As an example of its use when executed as part of a Select Statement, the Replace Action Command replaces the data in positions 43–52 of the command line by the data in positions 55–74. When executed as part of a Swap Statement, the Replace Action Command replaces the data in positions 55–74 with the data in positions 43–52. The preferred format for the Replace Action Command is as follows:

| POS | CONTENTS | DEFINITION |
|---|---|---|
| 1–3 | Action Group | The Action Group that ties this command to the SL or SL Statement. |

| POS | CONTENTS | DEFINITION |
|---|---|---|
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Replace | Starting position of the data to replace. |
| 17 | Comma | Comma delimiter |
| 18–28 | Blank | |
| 29–30 | Length to Replace | The length of data to replace.<br>On SL, the maximum is 10.<br>On SW, the maximum is 20. |
| 31 | Blank | |
| 32–33 | Replacement Length | The length of the replacement data.<br>On SL, then maximum is 20.<br>On SW, the maximum is 10. |
| 34 | Blank | |
| 35–38 | REPL | REPL Replace instruction for the File Converter. |
| 43–52 | Data to Replace | This is the data to replace on a SL.<br>This is the replacement data on a SW. |
| 53–54 | Blank | |
| 55–74 | Replacement Data | This is the replacement data on a SL.<br>This is the data to replace on a SW. |

Here are several examples of the Replace Command and their literal description:

```
              1         2         3         4         5         6
     123456789012345678901234567890123456789012345678901234567890123456
(1)  001    01,00005,         01 02 REPL  C            19
(2)  001    02,00010,         03 03 REPL  OLD          NEW
(3)  002    01,00010,         10 05 REPL  ABCDEFGHIJ   12345
```

(1) On SL transactions, for records identified by Action Group 001, the first thing to do is go out to position 5 and replace the data "C" with "19". On SW transactions, for records identified by Action Group 001; the first thing to do is go out to position 5 and replace the data "19" with "C".

(2) On SL transactions, for records identified by Action Group 001, the second thing to do is go out to position 10 and replace the data "OLD" with "NEW". On SW transactions, for records identified by Action Group 001, the second thing to do is go out to position 10 and replace the data "NEW" with "OLD".

(3) On SL transactions, for records identified by Action Group 002, the first thing to do is go out to position 10 and replace the data "ABCDEFGHIJ" with "12345". On SW transactions, for records identified by Action Group 002, the first thing to do is go out to position 10 and replace the data "12345" with "ABCDEFGHIJ".

Using Example (3), this reviews the impact of the Replace Command on data. Assume that the data is fifty position fixed format and looks like this:

```
          1         2         3         4         5         6
123456789012345678901234567890123456789012345678901234567890123456
000000000ABCDEFGHIJ0000000000000000000000000000000
```

When executed as part of an SL, the Replace Command goes out to position 10 and replaces "ABCDEFGHIJ" with "12345". After executing this command, the data looks like this:

```
          1         2         3         4         5         6
123456789012345678901234567890123456789012345678901234567890123456
000000000123450000000000000000000000000000000
```

Note that ABCDEFGHIJ is now 12345. Also note that the record length is now 45 and not 50.

When this same command is executed as part of a SW transaction, the reverse happens. The Replace Command goes out to position 10 and replaces "12345" with "ABCDEFGHIJ" . This returns the data to it's original configuration and data length:

```
          1         2         3         4         5         6
123456789012345678901234567890123456789012345678901234567890123456
000000000ABCDEFGHIJ0000000000000000000000000000000
```

This command replaces character data only. It does not replace hex, packed, etc. However, it can replace character data in records that have non-character data imbedded in it.

Be sure to consider the impact of the REPL Command on the key data for the SL and SW Statements. The following is an example of this situation. The SL statement identifies data by a "C" in position 6. The REPL Command replaces the C with 19. Therefore, the corresponding SW for this data must refer to "19" and not "C" in the key.

```
1234567890123456789012345678901234567890123456789012345678901230
SL    001    P00005'C'
SW    001    P00006'19'
001          01,00006,          01 02 REPL    C    19
```

In this example, the Action Group 001 for SL looks for "C" in position 6. On a swap (SW) it looks for "19". This is because the REPL Command changed the data used to identify the Action Groups.

The sixth Action Command is the Add/Delete Century to a Packed Field Action Command. This Action Command is used to insert or swap century from a packed (COMP-3) field. This Action Command is preferably formatted to carry the necessary instructions to the control program. In particular, this Action Command includes the length of the COMP-3 field, the format of the date, and a PACKED indicator. The control program adds/deletes the packed century to the appropriate place in the date field and adjusts the field size. The preferred format for the Add/Delete Century to a Packed Field Action Command is as follows:

| POS | CONTENTS | DEFINITION |
|---|---|---|
| 1–3 | Action Group | The Action Group that ties this command to Select Statement. |
| 4–8 | Blank | |

-continued

| POS | CONTENTS | DEFINITION |
|---|---|---|
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Date | This is the start of the date field. Note that depending the date format, it is not necessarily the start of the YEAR or where century will be inserted. |
| 17 | Comma | Comma delimiter. |
| 18–19 | Data length | Length of the data (not packed) to be inserted. For century, this is 02. |
| 20 | Comma | Comma delimiter |
| 21–22 | 19 | Century. |
| 23 | Blank | |
| 24–27 | WINDOW | The LTxx Window Command (where xx is the target year). |
| 28–29 | Blank | |
| 30 | COMP-3 length | The packed length of the unconverted COMP-3 date field. For example, 4 for YYMMDD COMP-3 dates. |
| 31–34 | Blank | |
| 35–40 | PACKED | Packed instruction for the File Converter. |
| 43–48 | Date Format | The FORMAT command describing the unconverted date field. For example, YYMMDD |

Here are several examples of the Add Century to a Packed Field Command and their literal description:

```
              1         2         3         4         5
    12345678901234567890123456789012345678901234567890123
(1) 001    01,00010,02,19 LT45    4    PACKED    YYMMDD
(2) 002    01,00010,02,19 LT45    4    PACKED    MMDDYY
```

-continued

| | | | | | |
|---|---|---|---|---|---|
| (3) | 002 | 02,00025,02,19 LT45 | 2 | PACKED | YY |
| (4) | 003 | 01,00010,02,19 LT45 | 3 | PACKED | YYDDD |

(1) We have a packed date field in YYMMDD format. For records identified by Action Group 001, the first item to perform is to go out to position 10 (the start of the date field) and add a two character 19 (add 20 if the year is less than 45). This date field occupies 4 positions packed and is in YYMMDD format.

(2) We have a packed date field in MMDDYY format. For records identified by Action Group 002, the first item to perform is to go out to position 10 (the start of the date field) and add a two character 19 (add 20 if the year is less than 45). This date field occupies 4 positions packed and is in MMDDYY format.

Note the different format in these two examples. Although the date fields start in the same location, the YEAR is located in different relative positions. By providing the format, the File Converter recognizes where to insert the century field. It is not necessary to provide the relative position of the YEAR, just the position of the date and the format. In example (1), the converted date field will be CCYYMMDD. In example (2), the converted date field will be MMDDCCYY (3) We have a packed year-only field (YY format). For records identified by Action Group 002, the second item to perform is to go out to position 25 (the start of the date field, and also in this case the start of the year) and add a two character 19 (add 20 if the year is less than 45). This date field occupies 2 positions packed and is in YY format. The field increases to a three position packed CCYY.

(4) We have a packed Julian date field (YYDDD format). For records identified by Action Group 003, the first item to perform is to go out to position 10 (the start of the date field) and add a two character 19 (add 20 if the year is less than 45). This date field occupies 3 positions packed and is in YYDDD format. The field increases to a four position packed CCYYDDD.

On a swap (SW), these same Action Cornmands have the opposite effect. On a SW, it will swap out these centuries inserted with the SL.

The seventh Action Command is the Add/Delete Century to Binary and Computational Fields Action Command, which is used to add and delete century to a binary or computational date field. This Action Command carries the necessary instructions to the control program including the length of the binary field, the format of the date, and a BINARY indicator. The control program then adds or deletes the binary century in the appropriate place in the date field while also expanding the binary field length when necessary. The preferred format for this Action Command is as follows:

| POS | CONTENTS | DEFINITION |
|---|---|---|
| 1–3 | Action Group | The Action Group that ties this command to one Select Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Date | This is the start of the date field. Note that depending on the date format, it is not necessarily the start of the YEAR or where century will be inserted. |
| 17 | Comma | Comma delimiter. |
| 18–19 | Data length | Length of the data (not binary) to be inserted. For century, this is 02. |
| 20 | Comma | Comma delimiter |
| 21–22 | 19 | Century. |
| 23 | Blank | |
| 24–27 | WINDOW | The LTxx Window Command (where xx is the target year). |
| 28–29 | Blank | |
| 30 | Binary length | The length of the binary date field. For example, 4 for YYMMDD binary dates and two for YYMM binary dates. |
| 31–34 | Blank | |
| 35–40 | BINARY | Binary instruction for the File Converter. |
| 43–48 | Date Format | The FORMAT command describing the unconverted date field. For example, YYMMDD |

Here are several examples of the Add/Delete Century to a Binary Field Command and their literal description:

```
     123456789012345678901234567890123456789012345678901230
(1)  001  01,00010,02,19 LT45    4   BINARY    YYMMDD
(2)  002  01,00010,02,19 LT45    4   BINARY    MMDDYY
(3)  002  02,00025,02,19 LT45    2   BINARY    YYMM
```

(1) We have a binary date field in YYMMDD format. For records identified by Action group 001 the first item to perform is to go out to position 10 (the start of the date field) and add a two character 19 (add 20 if the year is less than 45). This date field occupies 4 positions, is in binary YYMMDD format.

(2) We have a binary date field in MMDDYY format. For records identified by Action Group 002, the first item to perform is to go out to position 10 (the start ofthe date field) and add a two character 19 (add 20 if the year is less than 45). This date field occupies 4 positions, is in binary MMDDYY format.

(3) We have a binary field in YYMM format. For records identified by Action Group 002, the second item to perform is to go out to position 25 (the start of the date field) and add a two character 19 (add 20 if the year is less than 45). This date field occupies 2 positions, is binary and is in YYMM format. Note that the maximum value of a two position binary field is 32,768. Inserting 19 and 20 into this date field can produce the numbers 199912 and 200012. The size of these numbers requires the binary field to be increased to four positions.

The eighth Action Command is the Add/Delete Century With Occurs Records Action Command, which adds or deletes century when there is a fixed number of Occurs, with a maximum of 999. The file can have fixed or variable records. Within an Occurs, each action should be coded in a sending order. The preferred format for this Action Command is as follows:

| POS | CONTENTS | DEFINITION |
|---|---|---|
| 1–3 | Action Group | The Action Group that ties this command to the SL or SW Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Occurs | This is the start of the table or the occurs. Five position numeric. |
| 17 | Comma | Comma delimiter. |
| 18–19 | Data length | Length of the data to be inserted. For century, this is 02. |
| 20 | Comma | Comma delimiter |
| 21–22 | 19 | Century. |
| 23 | Blank | |
| 24–27 | WINDOW | The LTxx Window Command (where xx is the target year). |
| 28–30 | # Occur | The number of occurrences in the record table. Three position numeric |
| 31–33 | # Pos. in Occurs | The number of positions within a single occurs. Three position numeric. |
| 34 | Blank | |
| 35–40 | OCCURS | OCCURS literal - identifies Occurs for the File Converter. |
| 41–42 | Blank | |
| 43–48 | 1st Action | The values in columns 43–48 vary based on the data and the action to take. Options are: |

| COL | CHARACTER | BINARY | PACKARD | DELETE |
|---|---|---|---|---|
| 43 | I | B | P | D |
| 44–46 | data position within the occurs (start of year in the date field) | data position within the occurs (start of date field) | data position within the occurs (start of date field) | data position within the occurs |
| 47 | data length | data length | data length | data length |
| 48 | Format Code | Format Code | Format Code | length of data to delete |

| POS | CONTENTS | DEFINITION |
|---|---|---|
| 49–54 | 2nd Action | When there is a second action within the occurs; then these columns apply. |
| 55–60 | 3rd Action | When there is a third action within the occurs, then these columns apply. |
| 61–66 | 4th Action | When there is a fourth action within the occurs, then these columns apply. |
| 67–72 | 5th Action | When there is a fifth action within the occurs, then these columns apply. |
| 73–78 | 6th Action | When there is a sixth action within the occurs, then these columns apply |

The format for the data in these columns follows the same pattern as for the first occurs: Here it is documented based in its relative position rather than the actual column:

| COL | CHARACTER | BINARY | PACKED | DELETE |
|---|---|---|---|---|
| 1 | I | B | P | D |
| 2–4 | data position within the occurs (start of year in the date field) | data position within the occurs (start of date field) | data position within the occurs (start of date field) | data position within the occurs |
| 5 | Blank | data length | data length | data length |
| 6 | Format Code | Format Code | Format Code | length of data to delete |

The format codes are:

1=YYMMDD TO CCYYMMDD

2=YYMM TO CCYYMM

3=YYDDD TO CCYYDDD

4=MMDDYY TO MMDDCCYY

5=MMYY TO MMCCYY

6=DDMMYY TO DDMMCCYY

7=YY TO CCYY

8=YYWW TO CCYYWW

9=WWYY TO WWCCYY

Here are several examples of the Add/Delete Century with an Occurs and their literal description:

```
        123456789012345678901234567890123456789012345678901230
(1)  001    01,00041,02,19 LT45003010 OCCURS  I002      1I006 1
(2)  002    01,00250,02,19 LT45007025 OCCURS  P00127
(3)  003    01,00050,02,19 LT45003020 OCCURS  I002      1B01041
```

(1) For records identified by Action Group 001, recognize that there is an Occurs clause. The Occurs starts in position 41, there are three occurrences and each occurrence has ten positions. Insert a two character 19 (20 if the year is less than 45) in position 2 where there is a YYMMDD date and again in position 6 where there is another YYMMDD date. Do both of these date inserts for each of the three occurrences.

(2) For records identified by Action Group 002, recognize that there is an Occurs clause. The Occurs starts in position 250, there are seven occurrences and each occurrence has twenty-five positions. Insert a packed 19 (20 if the year is less than 45) in position 1 which is currently the start of a two position packed YY date field.

(3) For records identified by Action Group 003, recognize that there is an Occurs clause. The Occurs starts in position 50, there are three occurrences and each occurrence has twenty positions. Insert the appropriate century value as character data in position 2, where the date field currently is in FORMAT #1—YYMMDD. At position 10 insert the appropriate century value into the binary field four positions with a format of YYMMDD.

The ninth Action Command is the Add/Delete Century With Occurs Depending On Action Command, which adds or deletes century when there is an Occurs Depending On. The "depending on" should be present in the record. Again, the file can have fixed or variable records and each action should be coded in ascending order. The preferred format for this Action Command is as follows:

| POS | CONTENTS | DEFINITION |
|---|---|---|
| 1–3 | Action Group | The Action Group that ties this command to the SL or SW Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Occurs | This is the start of the table or the occurs. Five position numeric. |
| 17 | Comma | Comma delimiter |
| 18–19 | Data length | Length of the data to be inserted. For century, this is 02. |
| 20 | Comma | Comma delimiter |
| 21–22 | 19 | Century. |
| 23 | Blank | |
| 24–27 | WINDOW | The LTxx Window Command (where xx is the target year). |
| 28–30 | #Occurs | The maximum number of occurrences in the record table. Three position numeric |
| 31–33 | #Pos. in Occurs | The number of positions within a single occurs. Three position numeric. |
| 34 | Blank | |
| 35–36 | OD | OD literal - identifies Occurs Depending On for the File Converter. |
| 37–40 | OD Value | Position of the Occurs Depending On value. |
| 41 | OD Length | Length of the Occurs Depending On data field. |
| 42 | OD data definition | The data field definition for the Occurs Depending On data field. Valid codes are: B = Binary P = Packed I = Zoned Decimal/Character |
| 43–48 | 1st Action | The values in columns 43–48 vary based on the data and the action to take. Options are: |

| COL | CHARACTER | BINARY | PACKARD | DELETE |
|---|---|---|---|---|
| 43 | I | B | P | D |
| 44–46 | data position within the occurs (Start of year in the date field) | data position for the start of the date field within the occurs | data position for the start of the date field within the occurs | data position within the occurs to begin delete. |
| 47 | Blank | data length | data length | length of data delete |
| 48 | Format Code | Format Code | Format Code | length of data to delete |

| | | |
|---|---|---|
| 49–54 | 2nd Action | When a there is a second action within the occurs, then these columns apply. |
| 55–60 | 3rd Action | When there is a third action within the occurs, then these columns apply. |
| 61–66 | 4th Action | When there is a fourth action within the occurs, then these columns apply. |
| 67–72 | 5th Action | When there is a fifth action within the occurs, then these columns apply. |
| 73–78 | 6th Action | When there is a sixth action within the occurs, then these columns apply. |

The format for the data in these columns follows the same pattern as for the first occurs depending on. Here it is documented based in it's relative position rather than the actual column:

| COL | INSERT | BINARY | PACKED | DELETE |
|---|---|---|---|---|
| 1 | I | B | P | D |
| 2–4 | data position within the occurs (start of year in the date field) | data position for the start of the date field within the occurs | data position for start of the date field within the occurs | data position within the occurs to start deleting |
| 5 | Blank | data length | data length | length of data to |
| 6 | Format Code | Format Code | Format Code | length of data to delete |

The format codes are:

1=YYMMD TO CCYYMMDD

2=YYMM TO CCYYMM

3=YYDDD TO CCYYDDD

4=MMDDYY TO MMDCCYY

5=MMYY TO MMCCYY

6=DDMMYY TO DDMMCCYY

7=YY TO CCYY

8=YYWW TO CCYYWW

9=WWYY TO WWCCYY

The tenth Action Command is the Exit Action Command, which allows customers to invoke their own routines for handling some aspect of a file conversion. The Exit Action Command uses the same general coding technique as the other Action Commands and can be designed to work with both Select and Swap Statements. As noted above, when there are a large series of changes, it may be more efficient to use the Exit Action Command than the Replace Action Command. For example, the Replace Action Command is a great tool when changing ten product codes to ten different codes in a file. However, when changing 10,000 product codes, it may be more efficient to use the Exit Action Command. The Exit Action Command can eliminate the need to code 10,000 individual Replace Action Commands (one for each product).

The preferred format for an Exit Action Command is as follows:

| POS | CONTENTS | DEFINITION |
|---|---|---|
| 1–3 | Action Group | The Action Group that ties this command to the SL or SL Statement. |
| 4–8 | Blank | |
| 9–10 | Sequence | Identifies the sequence of the Action. The sequence indicates the order of execution. (01 is executed first, 02 is executed second, etc.). |
| 11 | Comma | Comma delimiter |
| 12–16 | Start of Replace | Starting position of the data to replace. |
| 17 | Comma | Comma delimiter |
| 18–28 | Blank | |
| 29–30 | Length to Replace | On SL, the length of data to replace. On SW, the length of the replacement data. |
| 31 | Blank | |
| 32–33 | Replacement Length | The length of the replacement data |
| 34 | Blank | |
| 35–38 | EXIT | EXIT instruction for the File Converter. |
| 39–42 | Program | Exit Program Name. |

Here are several examples of the Exit Command and their literal description:

```
          1         2         3         4         5         6
    123456789012345678901234567890123456789012345678901234567890123456
(1) 001    01,00005,      01 02 EXIT      YR2KPGM1
(2) 001    02,00010,      03 03 EXIT      YR2KPGM2
```

(1) On SL transactions, for records identified by Action Group 001, the first thing to do is go out to position 5 and replace the one position of data with two positions of data supplied by the exit program YR2KPGM1. On SW transactions, for records identified by Action Group 001, the first thing to do is go out to position 5 and replace the two positions of data with one position of data supplied by the exit program YR2KPGM1.

(1) On SL and SW transactions, for records identified by Action Group 001, the second thing to do is go out to position 10 and replace the three positions of data with three positions of data supplied by the exit program YR2KPGM3.

Although very specific examples are described above for various statements, parameters, commands, and formats for these statements, parameters, and commands, it will be appreciated by those skilled in the art that various modifications could be made to the formats and that other statements, parameters, or codes may be implemented. The particular formats listed are provided for purposes of example only and are formats that correspond to the statements as used and manipulated by the inventive computer program.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The invention claimed is:

1. A method for automatically converting date-related data that is read from, or written into, a data fie under control of a computer program, the method comprising the steps of:

providing a control program including parameters and commands for converting the field length of a data field that corresponds to date-related data;

inserting codes in the computer program file including a subroutine calling command such that the control program will be called and executed as a subroutine from within the computer program file;

executing the computer program file;

creating a temporary data record having at least one data field;

copying the identified date-related data into a data field of the temporary data record; and executing the control program when the computer program executes the subroutine calling command to automatically converting the field length of the data field of the temporary data record in order to allow either inclusion or exclusion of the century in a portion of the data field indicating the year prior to manipulation of the date-related data stored therein by the computer program.

2. The method as defined in claim 1, wherein the control program further performs the step of automatically inserting century data into the converted date-related data field prior to manipulation thereof by the computer program.

3. The method as defined in claim 2, wherein, if the computer program modifies the date-related data, the control program further performs the step of automatically deleting the inserted century data from the identified date-related data field after manipulation by the computer program.

4. The method as defined in claim 1, wherein the computer program further performs the step of automatically deleting century data from the identified date-related data field prior to manipulation thereof by the computer program.

5. The method as defined in claim 1, wherein the control program decreases the field length of the date-related data field in the temporary data record in order to delete the century from the portion of the data field indicating the year prior to manipulation of the date-related data by the computer program.

6. The method as defined in claim 1, wherein the control program increases the field length of the date-related data field in the temporary data record in order to allow inclusion of the century in the portion of the data field indicating the year prior to manipulation of the date-related data by the computer program.

7. The method as defined in claim 1, wherein the computer program is century compliant and the data file accessed by the computer program is not century compliant.

8. The method as defined in claim 1, wherein the computer program is not century compliant and the data file accessed by the computer program is century compliant.

9. The method as defined in claim 1, wherein the control program is executed on-line when the computer program executes the subroutine calling command.

10. The method as defined in claim 1, wherein the control program is executed in batch when the computer program executes the subroutine calling command.

11. The method as defined in claim 1, wherein the step of providing the control program includes inserting file conversion parameters into a model control program to generate a control program file, and compiling the control program file to generate the control program.

12. The method as defined in claim 1, wherein the temporary data record is deleted after the computer program has finished utilizing the manipulated date-related data.

13. A method for automatically converting data field lengths corresponding to specified items of data that are in a data file that is accessed by a computer program, the method comprising the steps of:

providing a control program including parameters and commands for converting the data field length corresponding to a specified item of data in the data file;

inserting codes in the program file including a subroutine calling command such that the control program will be called and executed as a subroutine from within the program file;

executing the computer program; and executing the control program when the computer program executes the subroutine calling command to automatically convert the field length of the specified item of data that is identified by the computer program in order to allow for modification of the item of data prior to manipulation thereof by the computer program.

14. The method as defined in claim 13, wherein the control program is executed on-line when the computer program executes the subroutine calling command.

15. The method as defined in claim 13, wherein the control program is executed in batch when the computer program executes the subroutine calling command.

16. The method as defined in claim 13, wherein the control program decreases the field length of the identified data field in order to allow exclusion of a segment of data from a portion of the data field prior to manipulation of the data by the computer program.

17. The method as defined in claim 13, wherein the control program increases the field length of the identified data field in order to allow inclusion of a segment of data in a portion of the data field prior to manipulation of the data by the computer program.

18. A system for automatically converting data field lengths of date-related data that are in a data file that is accessed by a computer program, the system comprising:

means for generating a control program including parameters and commands for converting the data field length of date-related data fields in the data file, wherein the control program includes means for automatically converting the data field length of date-related data identified by the computer program in order to allow either inclusion or exclusion of the century in a portion of the data field indicating the year prior to manipulation of the date-related data by the computer program; and means for executing the control program when the computer program executes a subroutine calling command inserted within the computer program file.

19. The system as defined in claim 18, wherein said means for generating a control program includes means for inserting file conversion parameters into a model control program to generate a control program file that may be compiled to generate the control program.

20. The system as defined in claim 18, wherein said converting means additionally automatically inserts century data into the converted date-related data prior to manipulation thereof by the computer program.

21. The system as defined in claim 20, wherein said converting means additionally automatically deletes the inserted century data from the identified date-related data field if the computer program changes the date-related data prior to writing the changed date-related data back into the data file.

22. The system as defined in claim 18, wherein said converting means additionally automatically deletes century data from the identified date-related data field prior to manipulation thereof by the computer program.

23. The method as defined in claim 22 further including the step of automatically inserts century data back into the converted date-related data field if the computer program changes the date-related data prior to writing the changed date-related data back into the data file.

24. The system as defined in claim 18, wherein said converting means decreases the field length of the identified date-related data field in order to delete the century from the portion of the data field indicating the year prior to manipulation of the date-related data by the computer program.

25. The system as defined in claim 18, wherein said converting means increases the field length of the identified date-related data field in order to allow inclusion of the century in the portion of the data field indicating the year prior to manipulation of the date-related data by the computer program.

26. The system as defined in claim 18, wherein the computer program is century compliant and the data file accessed by the computer program is not century compliant.

27. The system as defined in claim 18, wherein the computer program is not century compliant and the data file accessed by the computer program is century compliant.

28. The system as defined in claim 18, wherein the control program is executed on-line when the computer program executes the subroutine calling command.

29. The system as defined in claim 18, wherein the control program is executed in batch when the computer program executes the subroutine calling command.

* * * * *